United States Patent [19]

Chyu

[11] 3,994,654
[45] Nov. 30, 1976

[54] DIE FOR EXTRUDING THERMOPLASTIC SHEETS

[75] Inventor: Hyun S. Chyu, Chicopee, Mass.

[73] Assignee: Monsanto Company, St. Louis, Mo.

[22] Filed: Jan. 2, 1975

[21] Appl. No.: 537,975

[52] U.S. Cl. ............................... 425/376; 65/183; 425/461; 264/176 R
[51] Int. Cl.² ........................ B29D 7/04; B29F 3/04
[58] Field of Search ............... 264/176 R, 177 R; 425/4 C, 817 C, 461, 465, 380, 381, 466, 467, 377, 376; 65/183

[56] References Cited
UNITED STATES PATENTS

| | | | |
|---|---|---|---|
| 1,859,416 | 5/1932 | Tanzi | 425/467 |
| 2,489,951 | 11/1949 | Bump | 425/461 |
| 2,713,313 | 7/1955 | Femina | 425/461 |
| 3,461,496 | 8/1969 | Winstead | 425/380 X |

FOREIGN PATENTS OR APPLICATIONS 221,832   9/1907   Germany ................ 425/461

*Primary Examiner*—Francis S. Husar
*Assistant Examiner*—Mark Rosenbaum
*Attorney, Agent, or Firm*—William J. Farrington; James C. Logomasini; Neal E. Willis

[57] ABSTRACT

The present invention relates to an improvement in a die for extruding thermoplastic sheet having a controlled degree of microsurface roughness. The improvement comprises having a beveled leading edge on at least one of the die lips wherein the bevel is away from the die orifice in order to control the degree of microsurface roughness in the extruded sheet.

11 Claims, 6 Drawing Figures

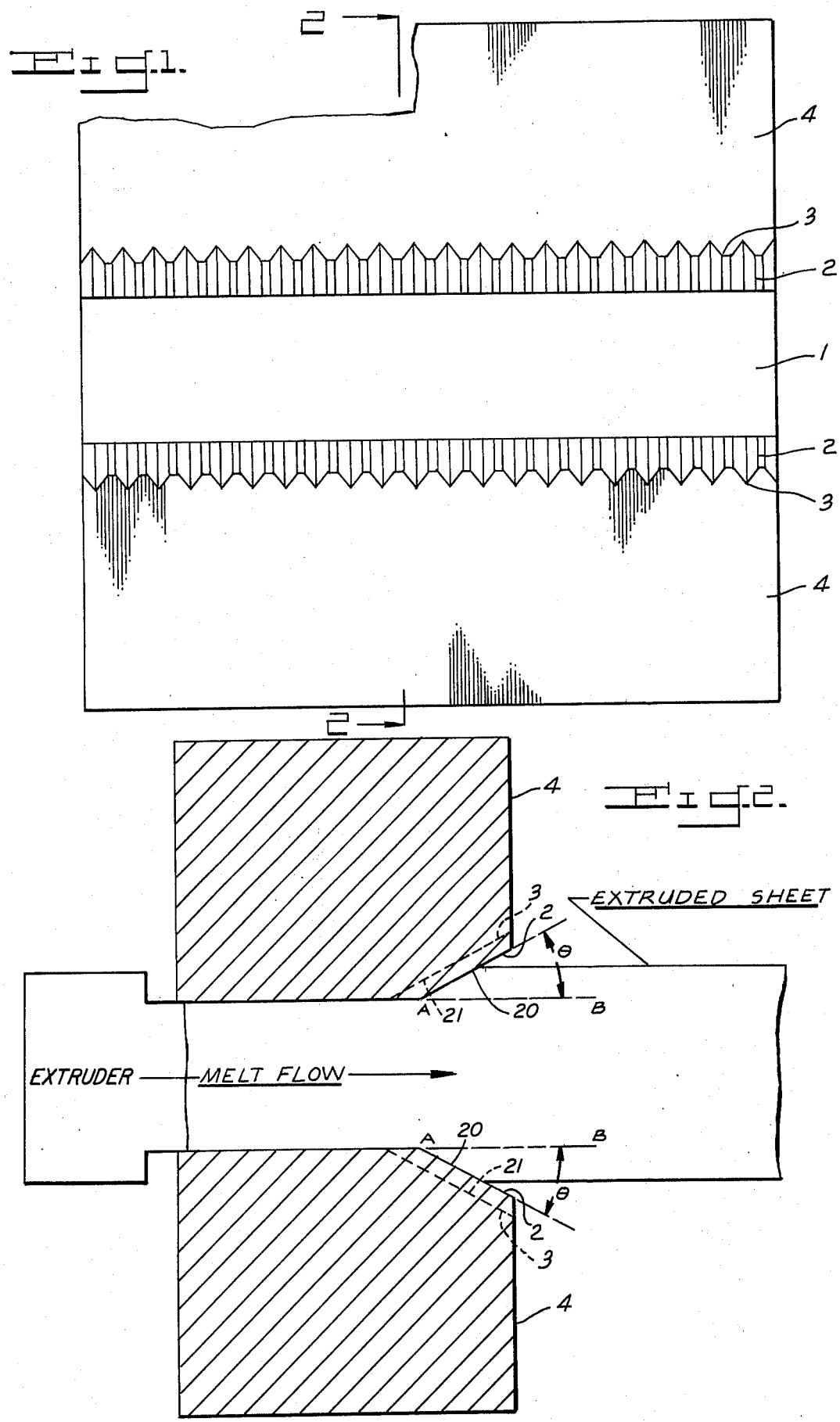

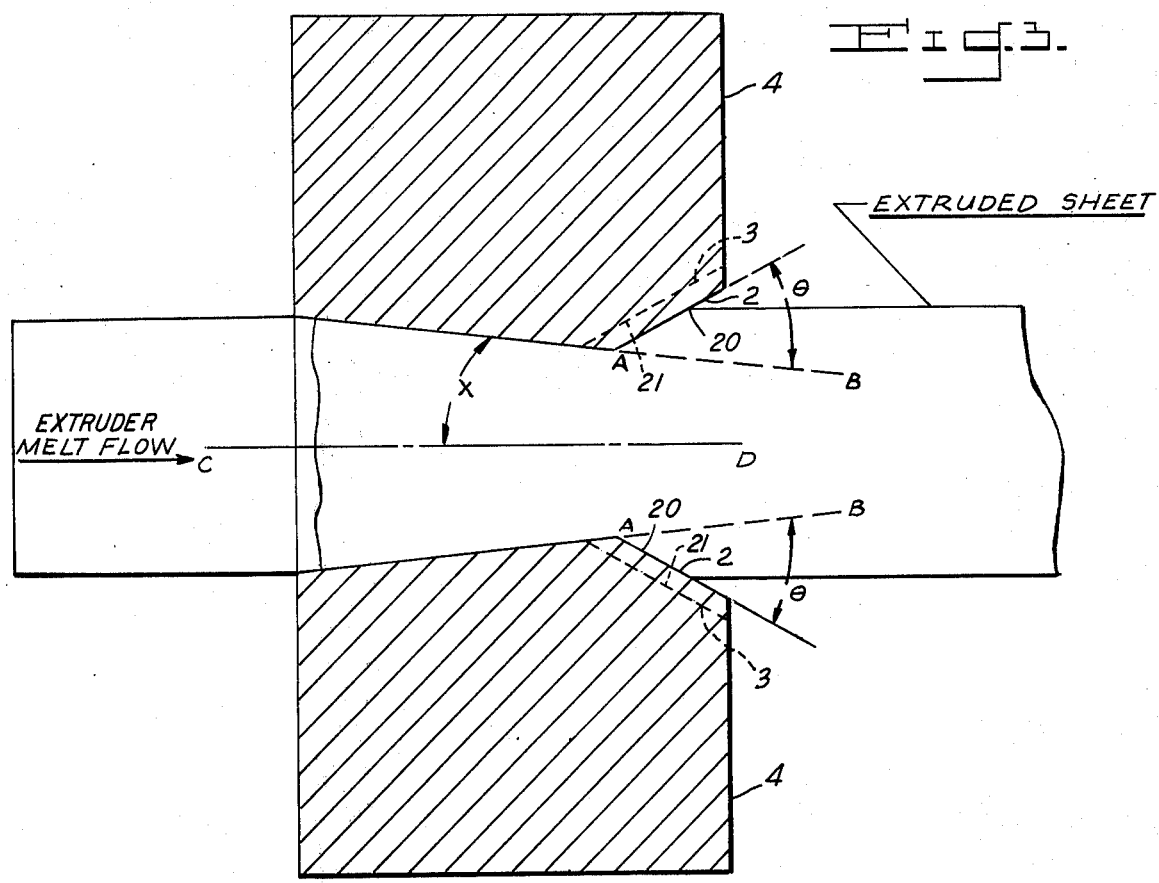
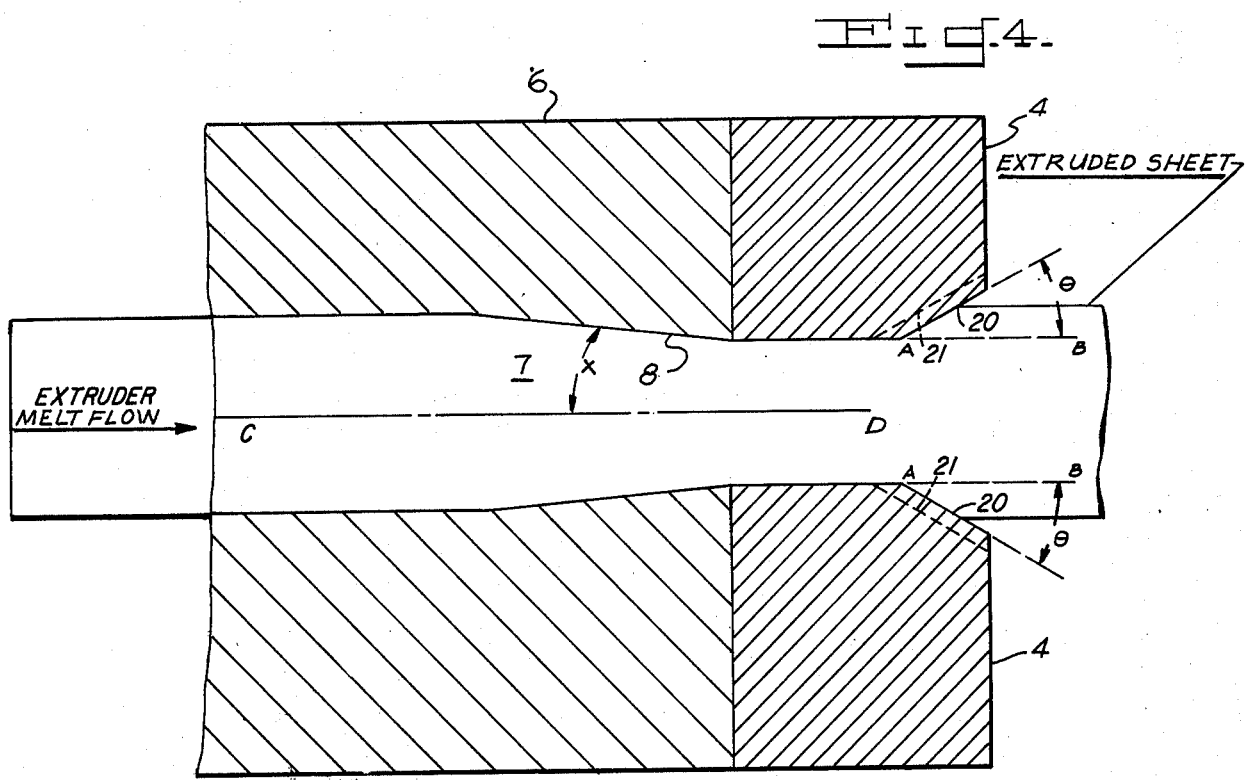

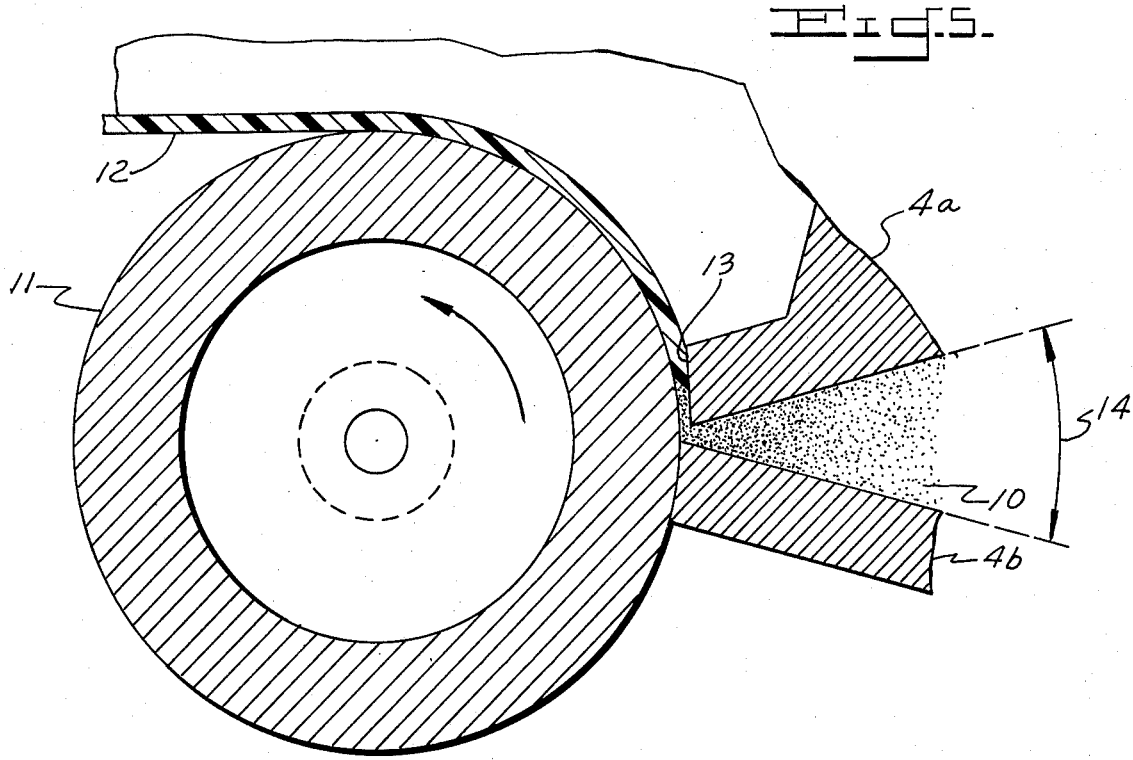
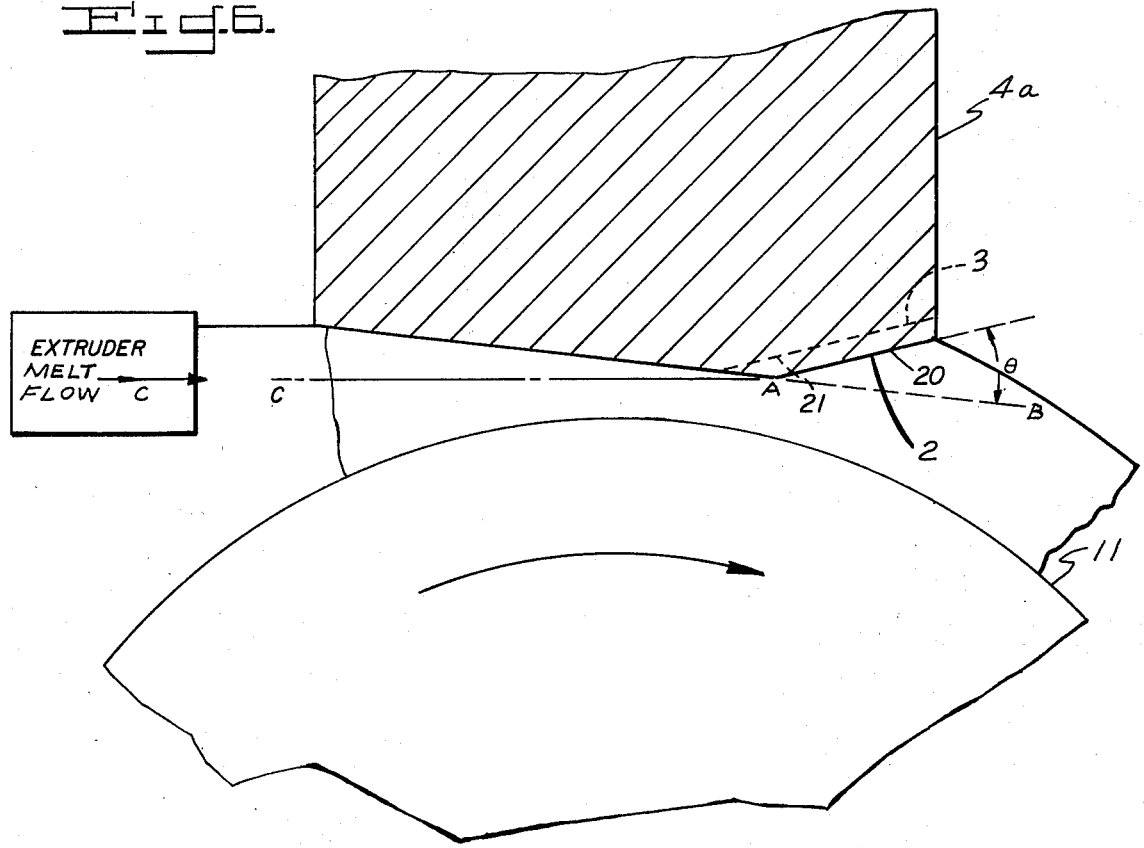

DIE FOR EXTRUDING THERMOPLASTIC SHEETS

BACKGROUND OF THE INVENTION

1. Field of the Invention

The present invention relates to dies for extruding thermoplastic sheet material. More particularly, the invention relates to dies wherein the leading edge of at least one die lip is beveled to a certain critical angle.

2. Description of the Prior Art

Dies for extruding molten thermoplastic material in sheet form are well known in the prior art. It is also know in the art that a controlled degree of microsurface roughness is desirable in thermoplastic sheet materials in order to minimize the tendency for the thermoplastic sheets to block, i.e., to adhere when they are in contact with each other as in rolled form or in stacks of cut sheet. U.S. Pat. No. 2,489,951 teaches die lips which are grooved in the direction of extrusion in order to prepare sheets having a controlled degree of microsurface roughness. While the invention in U.S. Pat. No. 2,489,951 provides a controlled degree of microsurface roughness a need exists in the art for improved apparatus and methods for imparting an even greater degree of microsurface roughness to extruded thermoplastic sheets. This is especially so in regard to the thermoplastic sheets used to prepare laminated safety glass. Improvements in the handling of plastic sheet material and the fabrication of laminated safety glass have created a need for plastic sheet material with less tendency to block itself or to adhere prematurely to the glass during the shaping and assembly operations.

SUMMARY OF THE INVENTION

The present invention provides an improved method and apparatus for obtaining improved controlled microsurface roughness in extruded thermoplastic sheet materals. The improved degree of controlled microsurface roughness is obtained by extruding the sheet through a die orifice wherein the leading edge of at least one of the die lips is beveled to a certain critical angle away from the die orifice which beveled portion further contains grooves running in the direction of the extrusion flow of the molten polymer.

A preferred apparatus comprises a die blade and a die roll which define a die orifice wherein the lip of the die blade is grooved in the direction of extrusion and wherein a compression zone is defined by the die blade and the die roll, wherein the die lip on the die blade has a beveled surface which tapers away from the die orifice.

DESCRIPTION OF THE DRAWINGS

FIG. 1 is a front view of a die.

FIG. 2 is a cross sectional view of the die taken on line 2—2 of FIG. 1.

FIG. 3 is a front view of a die wherein the die orifice tapers down towards the die lips.

FIG. 4 is a crosss sectional view of a die similar to that shown in FIG. 2.

FIG. 5 is a cross sectonal view of a die for extruding molten polymer onto a continuously moving surface.

FIG. 6 is an enlarged view of an extrusion die of the type shown in FIG. 5.

FIG. 1 is a front view of a die showing the die orifice 1 through which the molten thermoplastic polymer is extruded, the beveled edge 2 of the die lip, the grooves 3 in the beveled edge of the die lip and the die block 4.

FIG. 2 is a cross sectional view of the die taken on line 2—2 of FIG. 1. FIG. 2 shows the upper and lower die blocks 4 and the beveled edge 2 of the die lip. The dotted line 3 repesents the grooves on the die lips and dotted line A-B describes the beveled angle $\theta$. The molten thermoplastic polymer is extruded through the die orifice and the expansion of the extruded sheet within the confines of the die lips is controlled by the beveled angle $\theta$ which imparts a controlled degree of microsurface roughness to the sheet.

FIG. 3 is similar to FIG. 2 except that the die orifice tapers down towards the die lips. As the molten polymer moves in the direction of the extrusion flow it is compressed within the die orifice. The angle $\alpha$ defined by the line C-D, which is in the centerline of the die orifice, and the interior surface of the die orifice is referred to as the compression angle. The dotted line A-B defines the bevel angle $\theta$.

FIG. 4 is a cross sectonal view of a die similar to that shown in FIG. 2. In FIG. 4 the die is shown in communication with the tapered outlet 7 of an extruder 6. The forward interior surfaces 8 of the extruder outlet 7 are tapered to form a compression angle $\alpha$, which is defined by the dotted line C-D taken along the center line of the extruder outlet which is in communication with the die orifice. The compression angle $\alpha$ may be substantially the same or less than the beveled angle $\theta$ at the leading edge of the die.

FIG. 5 is a cross sectonal view of a die 4a and 4b for extruding molten polymer 10 onto a continuously moving surface 11 (a die roll) to form a polymeric sheet 12. The leading edge 13 of the die blade 4a has a beveled surface. The die blade 4a is positioned in relation to the continuously moving surface 11 to provide a compression angle between the die blade 4a and the continuously moving surface 11. The arrow indicates the direction taken by the continuously moving surface of the die roll.

FIG. 6 is an enlarged view of an extrusion die of the type shown in FIG. 5 wherein the molten polymer is extruded onto a continuously moving surface 11 of the die roll. In this particular configuration only the leading edge of the die blade 4a is beveled to an angle $\theta$ defined by the dotted line A-B. The dotted line C-A describes the compression angle formed between the die lip 4a and the continuous moving surface 11. The grooves in the beveled angle 2 of the die lip are represented by the dotted line 3.

FIGS. 2, 3, 4 and 6 also show a schematic drawing of an extruder (not to scale) and the bevel land 20 portion of the die lip having grooves 21 therein extending parallel with the bevel land, both of which taper away from the die orifice.

DESCRIPTION OF THE PREFERRED EMBODIMENTS

The beveled die lips of the present invention are preferably used in die configurations havng a compression angle through which the molten polymer flows. This angle may be formed within the die orifice or extruder outlet as is shown in FIGS. 3 and 4, respectively. Alternately, the compression angle may be formed between the die and a moving surface as is shown in FIGS. 5 and 6. This compression angle may vary from 0.5° to 20° depending on the particular configuration, with an angle of from 1° to 10° being preferred from the standpoint of the melt flow of the polymer. More preferably, the compression angle is between 1° to 5°. the bevel angle on the die lip should be approximately equal to or up to 5° greater than the compression angle formed within the die orifice by the taper of the orifice toward the die lips. When extruding onto the continuous moving surface, the most preferred compression angle formed between the die lip and the moving surface is in the range of from 1° to 5° with a corresponding beveled angle. When the bevel angle is substantially less than the compression angle there is no significant improvement in the microsurface roughness of the extruded sheet.

The length of the beveled portion of the die lip will vary with the type and size of the die. In general, the land length of the beveled portion will be in the range of from 0.1 to 5 cm. The beveled portion of the die lip should be grooved in the manner described in U.S. Pat. No. 2,489,951 which is incorporated herein by reference. However, in the present invention it is not necessary to groove the entire die lip surface. It is sufficient to groove only the beveled portion of the die lip.

The dies of the present invention may be made out of any of those suitable materials well known to those skilled in the art. The die lips are also beveled and grooved according to methods known to those skilled in the art.

The apparatus and methods of the present invention are especially useful in the preparation of extruded thermoplastic sheet material wherein it is desirable or necessary to impart a microsurface roughness to the sheet. Thermoplastic materials which may be formed into sheet using the apparatus and methods of the present invention include but are not limited to polystyrene, copolymers of styrene and at least one other monomer such as poly(styreneacrylonitrile (SAN) and poly(acrylonitrile-butadiene-styrene) (ABS), polyvinyl chloride, polyehtylene, polypropylene, polyurethane, polyvinyl butyral, polycarbonate, polymethylmethacrylate, etc. The preferred materials to be usedin the methods and apparatus of the present invention for the preparation of sheet material for laminated sagety glass are polyvinyl butyral, polyurethane, poly(ethylene-vinyl acetate), poly(ethylene-vinyl acetate-vinyl alcohol), poly(ethylene-methacrylate-acrylic acid), etc.

Surprisingly, extruded sheet formed using a die wherein at least one of the die lips has a beveled edge in accordance with the present invention has better surface characteristics as compared to sheet formed using the dies of th prior art without beveled die lips. The extruded sheets obtained according to the practice of the present invention have a greater, more uniform degree of microsurface roughness than those sheets obtained by the apparatus of the prior art.

Extruded sheet prepared according to the present invention has a generally smooth surface. However, close examination of the sheet shows a high but substantially uniform degree of microsurface roughness which results in less tendency to block and better sheet handling properties. The amount of microsurface roughness is conveniently determined by measuring the percent gloss on the sheet surface. Percent gloss correlates with the adhesion force required to separate layers of extruded viscoelastic sheet which are in contact i.e. in roll form or in stacks of cut sheet.

Percent gloss is measured with a Hunter 60° calibrated Gloss Meter manufactured by Hunter Associates Laboratories, Inc. of Fairfax, Virginia. The Gloss Meter indicates the percent of light reflected off the surface of the sheet. When the microsurface roughness of the sheet is greater, less light will be reflected and the gloss percent will be lower as will be the tendency of the sheet to block or to adhere prematurely to a substrate.

Gloss percent readings in excess of about 70 to 80% for plastic materials, especially the plasticized polyvinyl butyral used in laminated safety glass, indicated a low level of microsurface roughness. Such sheet has a high blocking tendency and will be difficult to handle, shape and process in the production of laminated safety glass. Conversely, gloss percent readings below 50 and preferably below 45 indicate the sheet has a greater degree of microsurface roughness. Such sheet has a lower blocking tendency and will be easier to handle, shape and process in the production of laminated safety glass.

The following examples are set forth in illustration of the present invention and are not to be construed as a limitation thereof. Unless otherwise indicated, all parts and percentages are by weight.

EXAMPLE 1

A plasticized polyvinyl butyral resin of the type conventionally used in laminated safety glass is extruded into a sheet about 0.076 cm (30 mils) thick using an apparatus of the type shown in FIGS. 5 and 6 using a die of the prior art of the type described in U.S. Pat. No. 2,489,951 having a grooved surface and forming a compression angle of about 3.5° with the moving surface. The sheet is extruded using a pressure of about 525 psi, a stock temperature of 213° C. (415° F.) and a die temperature of 113° C. (235° F.). The extruded sheet has a gloss of about 50 indicating a moderate degree of microsurface roughness.

EXAMPLE 2

This example illustrates the methods and apparatus of the present invention, wherein a beveled die lip is used to get a better degree of microsurface roughness. The apparatus and procedures of Example 1 are used here except that the leading edge of the die lip has a 4° bevel with a beveled land length of about 0.3 cm. The beveled edge is grooved in accordance with the teaching of U.S. Pat. No. 2,489,951. The gloss percent for the sheet prepared with the beveled die lip is about 35. The significant decrease in gloss level is indicative of a better degree of controlled microsurface roughness.

Visual examination of the sheets prepared in Examples 1 and 2 indicates that the sheet surfaces are essentially the same except that the sheet prepared according to Example 2 using a beveled die has less gloss indicating a greater degree of controlled microsurface roughness.

EXAMPLE 3

This example illustrates the need for using a beveled angle which is equal to or greater than the compression angle. Example 2 is repeated here except using a die lip having a beveled angle of 2°. The surface of resulting extruded sheet is evaluated and found to have a gloss percent of about 45. This is a higher level than that obtained in Example 2 when using a die lip with a 4° bevel.

What is claimed is:
1. In an extrusion apparatus for forming thermoplastic sheet material havig controlled surface roughness said apparatus having a compression angle through which the molten polymer flows, said apparatus comprising in combination an extruder and a die member through which the thermoplastic sheet material is extruded, the improvement which comprises having a beveled land on at least one of the lips of the die member said beveled land having grooves therein extending parallel to the beveled land wherein both the beveled land and the grooves taper away from the die orifice.

2. An extrusion apparartus of claim 1 wherein a compression zone is defined within the extrusion apparatus whereby molten thermoplastic polymer flowing through the compression zone of the extruder is compressed just prior to being discharged from the extrusion apparatus.

3. An extrusion apparatus as in claim 2 wherein the compression zone is formed within the extruder outlet which is in communication with the die member.

4. An extrusion apparatus as in claim 2 wherein the compression zone is formed within the die orifice.

5. An extrusion apparatus as in claim 1 wherein the compression zone is defined by a die blade and a continuously moving surface onto which the thermoplastic sheet is extruded.

6. An extrusion apparatus as in claim 5 wherein the compression zone is formed between the die and the continuous moving surface.

7. In an extrusion apparatus for forming thermoplastic sheet material having controlled surface roughness said apparatus comprising in combination a die blade having a die lip and a die roll which define a die orifice wherein a compression zone is defined by the die blade and the die roll, the improvement which comprises having a beveled land on the lips of the die blade said beveled land having grooves therein extending parallel to the beveled land wherein both the beveled land and the grooves taper away from the die orifice.

8. An extrusion apparatus as in claim 7 wherein the bevel angle on the die lip is substantially the same as or up to 5° greater than the compression angle formed by the die blade and the die roll.

9. An extrusion apparatus as in claim 7 wherein the compression angle is between 1° and 10°.

10. An extrusion apparatus as in claim 7 wherein the compression angle is between 1° and 5°.

11. In an extrusion apparatus for forming thermoplastic sheet material having controlled surface roughness said apparatus comprising in combination a die blade having a die lip and a die roll which define a die orifice wherein a compression angle of from 1° to 5° is defined by the die blade and the die roll, the improvement which comprises having a beveled land on the lip of the die blade said beveled land having grooves therein extending parallel to the beveled land wherein both the beveled land and the grooves taper away from the die orifice, wherein the bevel angle is equal to or no more than 5° greater than the compression angle.

* * * * *